United States Patent [19]

Howard

[11] Patent Number: 5,105,523
[45] Date of Patent: Apr. 21, 1992

[54] METHOD AND MEANS ASSURING REPEATABLE CONCENTRICITY

[75] Inventor: Carl J. Howard, Kingsley, Mich.

[73] Assignee: Sheffer Collet Company, Traverse City, Mich.

[21] Appl. No.: 706,777

[22] Filed: May 29, 1991

[51] Int. Cl.$^5$ ............................................. B23Q 3/00
[52] U.S. Cl. ................................... 29/467; 29/527.1; 156/305; 156/294; 264/262
[58] Field of Search .................. 29/467, 559, 527.1; 82/904, 142; 156/305, 294, 423; 264/262; 279/1 Q, 1 L, 1 A, 62; 33/645; 409/903

[56] References Cited

U.S. PATENT DOCUMENTS

| | | | |
|---|---|---|---|
| 3,672,032 | 6/1972 | Witherspoon | 29/555 X |
| 3,712,632 | 1/1973 | Wightman et al. | 279/62 X |
| 3,751,796 | 8/1973 | Wise | 29/559 |
| 4,159,298 | 6/1979 | Bainard | 29/527.1 X |
| 4,458,405 | 7/1984 | Cavagnero et al. | 29/467 |

Primary Examiner—Larry I. Schwartz
Assistant Examiner—Julie R. Daulton
Attorney, Agent, or Firm—Price, Heneveld, Cooper, DeWitt & Litton

[57] ABSTRACT

A chuck support base for very accurate machining of parts includes a pair of interengaging members through which rotary motion is delivered to a tool holding chuck. The member on which the chuck is mounted has a ring with an internal frusto-conical exterior surface of a drive member mounted on the chuck support base of a machine tool. Both the ring and the driver member are secured to their supporting members by a bonding agent which initially is liquid and hardens while the structure to which it is attached is rigidly supported in a jig so that any variation from total concentricity with the axis of rotation of the tool is eliminated by compensating the positioning of the two rings before the bonding agent sets.

5 Claims, 2 Drawing Sheets

METHOD AND MEANS ASSURING REPEATABLE CONCENTRICITY

SUMMARY OF THE INVENTION

A chuck support base for very accurate machining of parts includes a pair of interengaging members through which rotary motion is delivered to a tool holding chuck. The member on which the chuck is mounted has a ring with an internal frusto-conical surface which engages the mating frusto-conical exterior surface of a drive member mounted on the chuck support base of a machine tool. Both the ring and the driver member are secured to their supporting members by a bonding agent which initially is liquid and hardens while the structure to which it is attached is rigidly supported in a jig so that any variation from total concentricity with the axis of rotation of the tool is eliminated by compensating positioning of the two rings before the bonding agent sets.

BACKGROUND OF THE INVENTION

There is an increasing necessity for very accurately machined parts, in the manufacture of which acceptable tolerances have been materially reduced. Heretofore, the precision now demanded for many products could be obtained but only at a substantial increase in cost and a very significant reduction in productivity. The problem largely arises out of the inability to make machine tools capable of meeting these standards and of enabling the tools to maintain such standards during usage. The problem has made tools for such requirements specialized equipment capable of manufacture and maintenance by only the most experienced and highly skilled machinists. In effect, each such machine has been an individual precision machine requiring specialized operation and maintenance. It is the object of this invention to make it possible to incorporate such precision into equipment without incurring the high cost of specialized tooling and the necessity for specialized skills.

BRIEF DESCRIPTION OF THE INVENTION

The workpiece gripping jaws of the chuck are mounted on an adapter assembly which, in turn, is secured to the shaft or spindle of a machine tool such as a horizontal mill. It is irrelevant to the application of this invention whether the axis of rotation of the tools is horizontal or vertical. Therefore, while the following description assumes a horizontal axis of rotation, the application of the invention is not so limited.

The adapter assembly has a pair of frusto-conical surfaces which interengage to center the axis of rotation of the adapter assembly to that of the spindle of the machine tool so that the workpiece secured by the gripping jaws will be rotated precisely about the center of rotation of the shaft. Thereby machining done on the workpiece will be accurately centered about the workpiece's central axis.

DESCRIPTION OF THE PREFERRED EMBODIMENT

Figure 1:
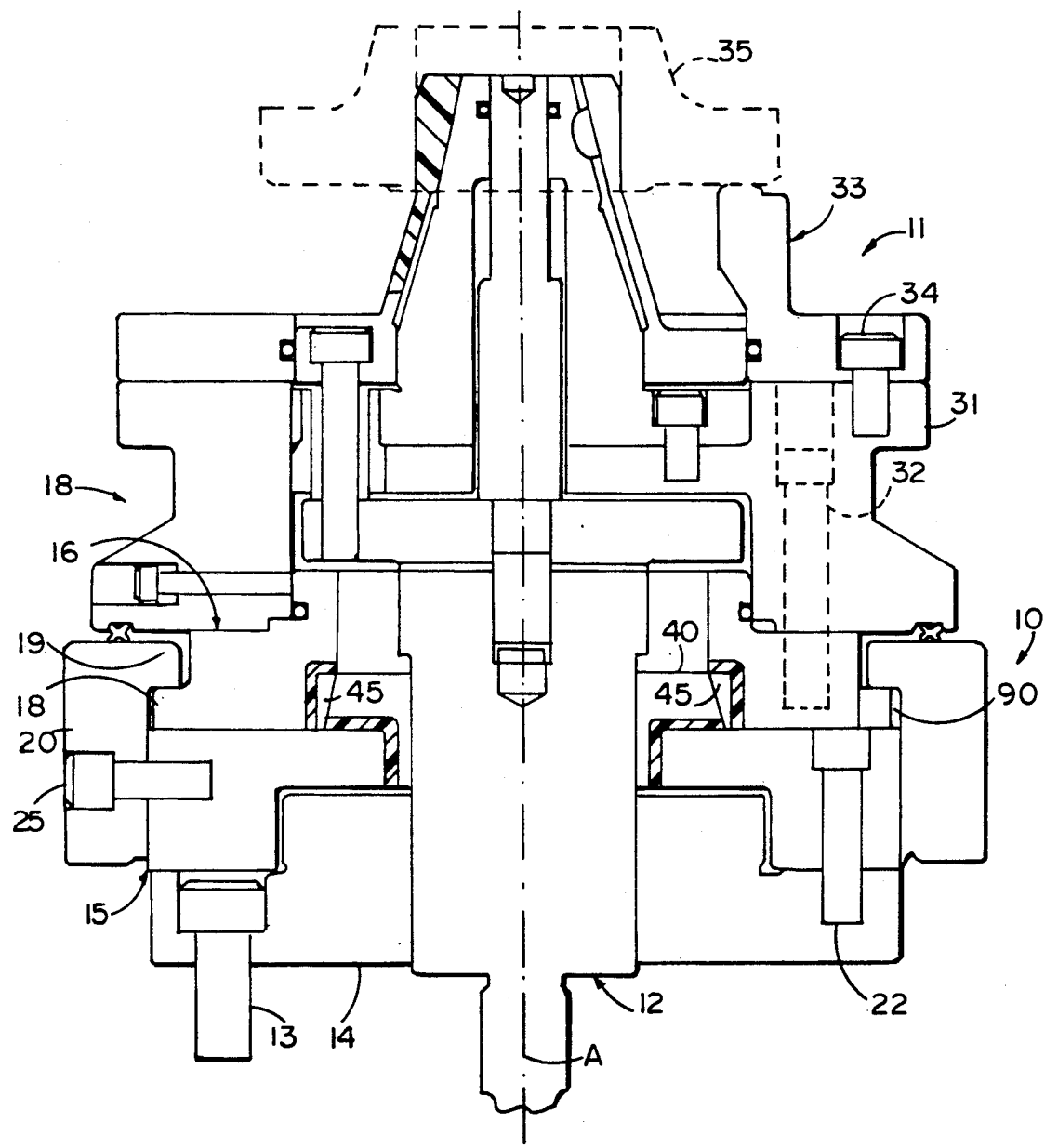
FIG. 1 is a central sectional view of a workpiece holding chuck adapted for mounting on the spindle of a machine tool.

In the drawings, cross-sectioning has been omitted except for that of the bonding material by which the invention is implemented, to avoid the confusion of excessive lines and permit clearly readable identification of the structure by reference numbers.

Driven by the spindle 12 through bolts 13 is a header 14 (FIG. 1). The adapter assembly 10 by means of bolts 22 is mounted on and driven by the header 14 (FIG. 1). Included in the adapter assembly is the base 15, the centering ring 16 and the clamping ring 20. The centering ring 16 seats on the base 15 and has a flange 18 which seats under and is clamped by the ears 19 of the clamping ring 20.

The collet assembly 11 seats against and is detachably bolted to the adapter assembly 10. The workpiece 35 is seated on the supports 33 which are secured to the workpiece holder base 31 by bolts 34.

The invention is incorporated in the alignment of the collet assembly 11 with the axis of rotation of the spindle 12. This is accomplished by the structure illustrated in detail in FIGS. 1-5. This structure incorporates the interengaging conical head 41 and the internally conical ring 45. By means of the positioning of these two elements with respect to the structure to which they are secured such that both elements are concentrically aligned about the central axis (A) of the spindle 12, any eccentricity with respect to axis A, which even close tolerance machining will allow to occur, is eliminated.

The workpiece supporting collet 11 is secured to the adapter 31 by bolts 32 (FIG. 1). The workpiece support 33 is secured to adapter 31 by bolts 34.

Figure 2:
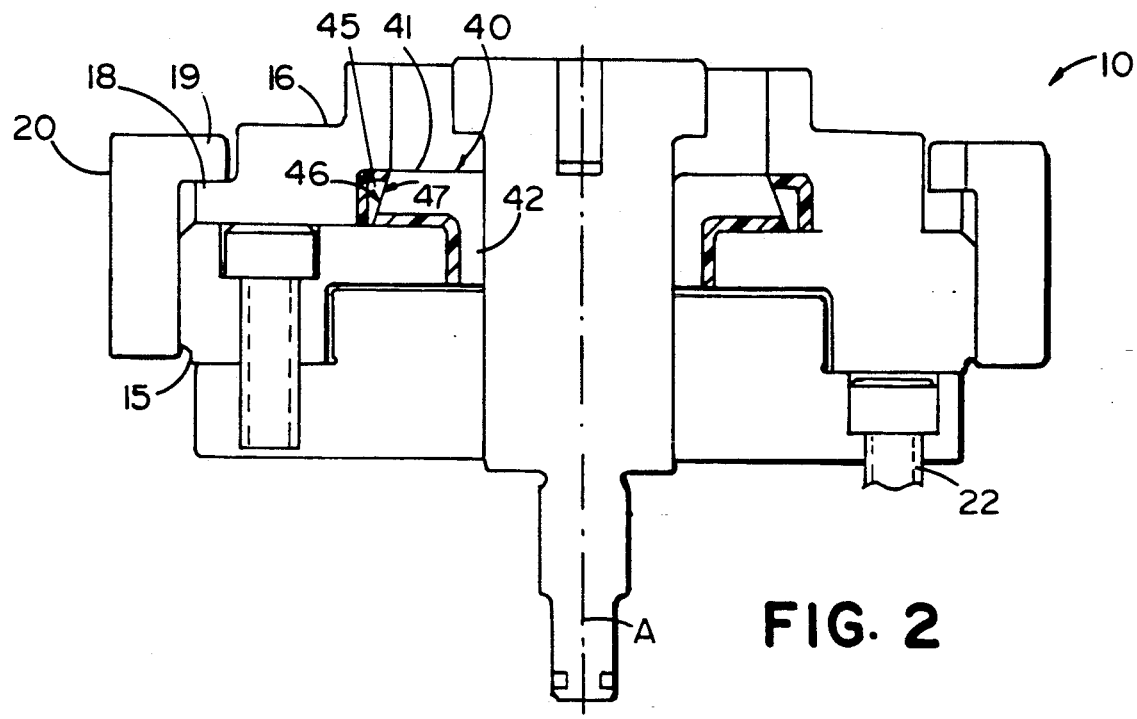
FIG. 2 is a central sectional view of the adapter assembly incorporated in the chuck illustrated in FIG. 1.

The centering of the collet 11 about the axis of rotation A of the machine tool on which the collet is mounted is accomplished by a pair of cones (FIGS. 1 and 2). The inner or male cone 40 surrounds the draw bar 12 and has a forward head portion 41 of frusto-conical cross section and a rearwardly extending tubular section 42. Seated about the male cone 40 is a ring 45, the inner wall 46 of which is conical and nests tightly against the outer conical face 47 of the head portion 41 of the inner cone 40. It is through the engagement of the outer conical face 47 of the inner cone 40 with the inner conical wall 46 of the ring 45 that the centerline of the collet portion 11 of the chuck is accurately aligned with the axis of rotation A of the spindle of the machine tool on which the chuck is mounted. It is through this alignment that a chuck equipped with this invention obtains its accuracy.

To obtain this accuracy, the attachment of the inner cone 40 to the base 15 is performed in a special jig 60. In similar manner, attachment of the ring 45 to centering ring 16 is performed in a special jig 80 (FIG. 14). These special jigs are provided to precisely center both the conical head and the ring about the axis of rotation of the spindle 12.

Figure 3:
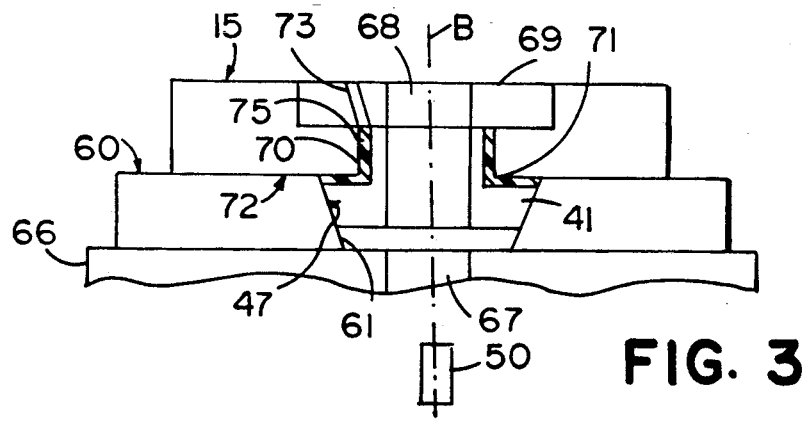
FIG. 3 is a central section view, the jig for centering the cone to the axis of rotation of the machine tool spindle.
Figure 4:
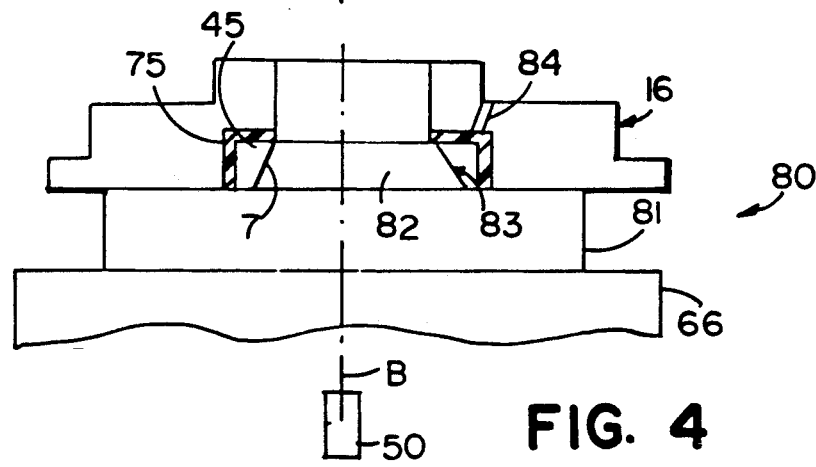
FIG. 4 is a central sectional view of the jig for centering the ring which engages the cone to the axis of rotation of the machine tool spindle.

The jig 60 is mounted on a base having a central conical opening 61 designed to accurately seat the conical head portion 41 when it is inverted and seated as shown in FIG. 4. The conical walls of the opening 61 are precisely machined to center the outer conical face of the head portion 41 precisely with respect to the central axis B of the jig. This jig is so designed and made that the axis A of FIG. 1 is identical to the axis B of FIGS. 3 and 4. The actual chuck base 15, which will be incorporated in the finished chuck, is then placed on it in an inverted position, frusto-conical head 41 seated in the conical opening 61. A cap 69 or other closure member is preferably placed in the opening 65 in which the header 14 (FIG. 1) will be received when the chuck is assembled for installation on the spindle. The inverted chuck base 15 can then be moved as needed with respect to the central axis B of the jig until its central axis is accurately aligned with that of the jig. This can be done in a number of ways, one of which is to provide a laser beam source 50 in the support 66 with its beam projected upwardly through the opening 67 in the base and the opening 68 extending through both the cone 40 and the cap 69. The laser beam is about the axis B and, in practice, represents this axis. The laser beam provides a very accurate means of reference by which, through the use of instruments, any eccentricity in the location of the opening 70 in the base 15 can be detected and the position of the base moved so that the opening 70 is precisely centered about the axis B.

When this alignment has been established, adhesive 75 is injected into the gap 71 between the conical head section 41 of the cone 40 and the adjacent near face 72 of the base 15. Simultaneously, the adhesive is also injected into the opening 70 surrounding the axially extending collar portion 42 of the inner cone. This injection can be made through one or more injection openings 73 in the cap 69 which openings are provided solely for that purpose. While the adhesive is being injected, the base assembly is clamped to the rigid support 60 to prevent it from shifting out of concentricity with the central axis B of the locating jig 60. The clamps are not illustrated since they are state of the art in the field of tool and fixture design. When the adhesive sets or hardens it becomes rigid forming a layer which may be of varying thickness circumferentially of the space between the tubular section 42 and the base 15 and permanently bonding the cone 40 to the adjacent walls of the base 15. In this manner, any eccentricity in the central opening in the base 15 is neutralized or compensated for in the space filled by the adhesive. Where the adhesive would contact the face of the conical opening 61, the surface of the opening can be coated with a material to which the adhesive will not bond. Thus, the adhesive will not interfere with separation of the base and cone from the jig.

In like manner, a special assembly jig 80 is prepared for locating the ring 45 (FIG. 4). In this case, the base 81 of the jig 80 has an upstanding frusto-conical portion 82, the exterior face 83 of which has been very accurately machined to be concentric with the central axis B of the jig 80. The outer or female ring 45 is seated around the conical section 82 of the base. Again, the machining of the inner conical face of the ring 45 has been done with a high degree of accuracy so that it seats tightly around and in full contact with the exterior face 83 of the conical section 82. Since these surfaces are both very closely and accurately machined surfaces, the ring will accurately seat on the section 82. Once this has been done, the adapter 16 is seated over the ring 45 mounted on the conical section 82.

Using an instrument which makes it possible to visually determine the relative position of the chuck adapter 16 with respect to the centerline of the ring 45, the position of the chuck adapter 16 is moved relative to the centerline B until the central axis of the ring 45 and the centerline B are identical. Once again, this centerline can be represented by a laser beam. Then, by injection of a bonding agent 75, such as Moglese, into the gap between the ring 45 and the adapter 16 while both are held stationary with respect to each other, the positions of the two parts are permanently established to provide concentricity of operation. The bonding material is introduced through the opening 84, of which a number can be provided to assure uniform and complete application of the adhesive. Once set, the adhesive forms a permanent bond between the conical ring 45 and the centering ring 16.

Since both the ring 45 and the cone 40 are centered about a common axis, and this axis is the same as the axis A depicted in FIG. 1, the chuck will automatically and accurately, position the workpiece holder with respect to the axis of rotation of the chuck. Since this adjustment would involve a radial shift of the centering ring 16 with respect to the axis A and the base 15, some clearance 90 must be provided between the outer face of the flange 18 and the inner wall of the clamp 20. This is necessary because the clamp is mounted to and surrounds the outer face of the base 15. While both the base 15 and the centering ring are coaxial with the axis A, this does not prevent tolerance accumulation to be a cause of interference between the perimeter of the flange 18 and the clamp 20 unless some relief is provided for.

The same type of equipment arranged in the same manner as described in connection with FIG. 3 can be used for this purpose To permit use of the laser or similar centerline defining equipment, the jig 80 and its support 85 ill be provided with a central opening 86.

It will recognized that, in the case of both the ring 45 and the inner cone 40, enough gap, although small, must be provided between the part being bonded and the walls of the opening into which it is to be installed. This is necessary to permit the part to be shifted enough to become centered about the axis B and leave enough room on all sides that, at least, a film of the bonding agent will be formed between the adjacent surfaces.

This arrangement has the benefit of providing accuracy of tool location because through the adjustment of the location of the chuck adapter 16 with respect to the axis B of rotation of the spindle 12, the work holding collet 11 can be very accurately centered with respect to the axis of rotation of the machine tool on which it is mounted on the spindle. Further, should wear or damage occur, the same technique can be used to quickly and accurately replace parts which have, for example, become worn due to prolonged usage and repeated removal and reinstallation on the machines. The tools or jigs illustrated in FIGS. 3 and 4, of course, become permanent tools capable of repeated use in the building of numerous chucks having the same spindle diameter. Thus, they become part of the permanent tooling of the facilities in which the chucks are made.

It will be recognized that various modifications of this invention can be made without departing from the principles of the invention. Such modifications are to be considered as included in the hereinafter appended claims unless the claims, by their language, expressly state otherwise.

I claim:

1. A chuck adapter mountable on the drive spindle of a machine tool, said adapter having means for supporting an article gripping means of a chuck in precise alignment with the center of rotation of the drive spindle on which the adapter is mounted, said adapter means comprising: a drive spindle engaging plate, said plate having a central axial opening, an annular base member mounted on said plate having a central drawer bar opening; a cone element having a circular body portion the outer radial face of which is frusto-conical and an inwardly extending tubular collar portion, a locator rnng surrounding said cone element and having an internal conical face seating snugly against the conical face of said cone element; an adapter ring secured to said base member having a radially inwardly facing annular recess, said locator ring being seated in said recess, a first layer of a bonding material between said base member and both said body and collar portions of said cone element whereby said collar can be positioned concentrically with the axis of rotation of said adapter even though there is some eccentricity between said cone surface and the axis of rotation of said adapter, a second layer of bonding material between said locator ring and said adapter ring whereby said adapter ring is positioned concentrically with said central axis irrespective of any eccentricity of said recess.

2. In a chuck mountable on the end of the spindle of a machine tool, said chuck having a workpiece gripping means and an adapter element, first means for mounting said adapter element on said spindle, second means for mounting said gripping means on said adapter element, said adapter element having a base for attachment to said spindle, said base having a central opening therethrough, a centering ring secured to said base, said centering ring having a central axial opening and a radially inwardly facing recess adjacent said base, a second ring seated in said recess, said second ring having a radially inwardly facing conical surface, a layer of initially liquid bonding material between the exterior surface of said second ring and the walls of said recess on which said second ring floated within said recess until said second ring was coaxial with the axis of rotation of the spindle; a cone having a radially outwardly facing conical surface surrounding and seated against said conical surface of said second ring, said cone extending radially over a portion of the axially outwardly facing surface of base, a layer of said bonding material between said cone and the surface of said base overlaid by said cone on which said cone floated until said cone was positioned coaxially of the axis of rotation of said spindle and while so positioned said bonding material hardened to lock said cone in position.

3. Means for centering a workpiece engaging head of a chuck about the axis of rotation of a spindle on which the chuck is mounted, said chuck having a spindle engaging means, an adapter between said head and said spindle engaging means and secured to both, said adapter having a base member secured to said spindle engaging means and a centering ring secured to said workpiece engaging head, means interconnecting said base member and said centering ring, said interconnecting means including an inner cone having a head portion and an axially extending sleeve portion, said base member having a central axial opening into which said sleeve portion extends with said head portion overlying the face of said base member facing axially away from said spindle, a layer of liquid bonding material between said sleeve portion and said head portion of said cone radially overlying the face of said base member, whereby the central axis of said inner cone can be positioned concentrically with the central axis of said spindle before said liquid banding material sets, said interconnecting means also including a second ring having an internal surface of a diameter and inclination to the axis of rotation of said spindle whereby said second ring can be seated against and closely engage the head portion of said inner cone, said centering ring having a recess in its inner face, said second ring being seated in said recess, a layer of liquid bonding material between said centering ring and the walls of said recess whereby before said bonding material hardens the central axis of said centering ring can be positioned concentrically with the central axis of said spindle for centering both said centering ring and the workpiece engaging head about the central axis of said spindle.

4. In a chuck mountable on a spindle of a machine tool, said chuck having a workpiece gripping means and an adapter element seated between and connected to both said spindle and said workpiece gripping means, said adapter having means for aligning the centerline of said workpiece gripping means with the centerline of said spindle, said aligning means comprising: said adapter having a base member connected to and driven by said spindle, said base member having a central opening, an inner cone member having a head portion and a tubular portion, said head portion having a frusto-conical outer surface, a centering ring seated on said base member opposite from said spindle and surrounding the head portion of said cone member, said centering ring having a recess in its inner face aligned with said outer surface, a second ring seated in said recess having a frusto-conical inner surface seated tightly against the like surface of said cone member; said head portion of said inner cone overlying an inner portion of said base member; adjacent surfaces of said cone member and said base member being spaced, said space being filled by a hardenable adhesive while said inner cone is secured in a position centered about the central axis of said spindle, the adjacent surfaces of said recess and said second ring defining a space filled by a hardenable adhesive while the inner conical surface thereof is secured in a position centered about the central axis of said spindle whereby the central axis of said gripping means is coaxial with the central axis of said spindle.

5. In the method of obtaining alignment of workpiece gripping elements of a chuck about a central axes common to both the workpiece held by the elements and a spindle of a machine tool on which the chuck is mounted, the steps which include: providing a first anchor means for attaching the chuck to the spindle and a second anchor means for connecting the first anchor means to the gripping elements; the gripping elements, providing a pair of circular position controlling elements having interengaging frusto-conical surfaces, attaching first of said position controlling elements to the spindle and second to said workpiece gripping elements; by a flowable and hardenable bonding material mounting first of said position controlling elements telescopically to means driven by said spindle and before said material hardens locating said first element concentrically of the axis of rotation of said spindle., mounting second of said position controlling elements to a support means for said workpiece gripping elements; by a flowable and hardenable bonding material locating said second position controlling element concentrically of the axis of rotation of said spindle and, while so located, bonding said second position controlling element to said support means by allowing said bonding material to harden.

* * * * *